Patented May 20, 1941

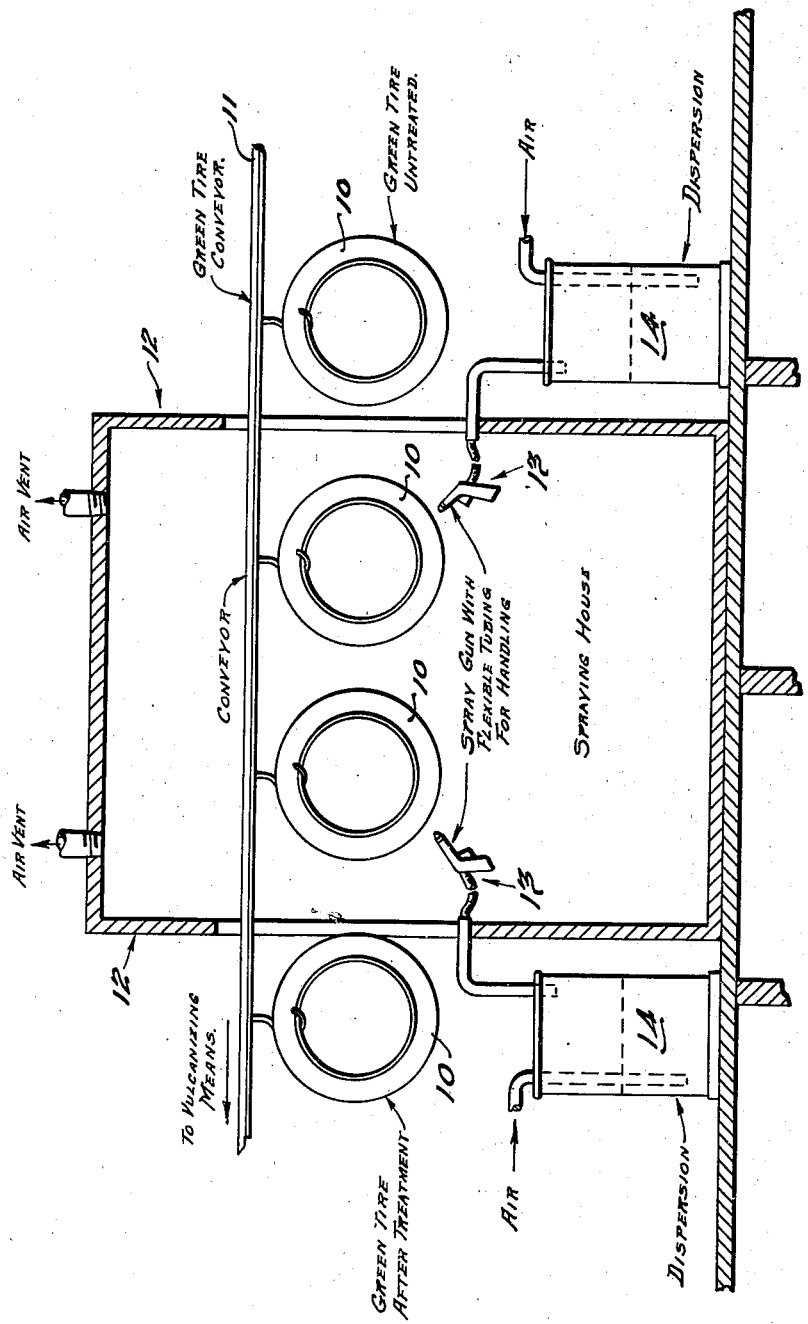

2,242,264

UNITED STATES PATENT OFFICE 2,242,264

TREATMENT OF RUBBER TIRES

George L. Roberts, Charleston, W. Va.

Application April 17, 1939, Serial No. 268,339

12 Claims. (Cl. 18—53)

This invention relates to methods of treating tires, and particularly to methods for finishing the same and facilitating their handling during or after vulcanization. Further, the invention relates to dispersions useful in connection with such tire treating methods, and to methods of making such dispersions.

In accordance with the present procedure green or uncured tires are dusted with soapstone and then conveyed into the vulcanizing apparatus. The soapstone acts as a lubricant and prevents the tires from sticking to the molds at the time of and subsequent to vulcanization. The use of soapstone dust is not only costly, but makes the maintenance of clean working conditions almost impossible, and requires additional labor merely for the purpose of removing excess dirt and dust. The health of workmen is also seriously endangered by the continual presence of siliceous dust in the air.

After removing the tires from the molds they are painted to provide the desired black color. This painting of the tires after vulcanization is likewise undesirable as it adds to the cost of finishing the tires.

It is accordingly an important object of the present invention to provide a method of treating tires or other rubber objects prior to vulcanization which not only facilitates removal of the tires from the vulcanizing molds but also provides a very desirable and relatively stable finish on the surfaces of the vulcanized tires.

Another object of the invention is to provide a method of lubricating tires or other rubber objects during the curing or vulcanizing operation which avoids the use of dusty lubricants or similar substances.

A further object of the invention is to provide a method of treating tire or other rubber surfaces which involves the employment of a lubricant of such color that the tires may be removed from the vulcanizing molds without requiring a separate coating or painting operation to impart the desired black coloration thereto.

Other objects of this invention will appear from the following description and appended claims, reference being had to the accompanying drawing forming a part of this specification, and which is a diagrammatic view showing one method of carrying out the present invention.

The present invention will be hereinafter described by way of example and not of limitation as applied to rubber tire manufacture. It is to be understood that the process likewise may be employed with any desired type of rubber surface to secure proper lubrication of the vulcanization molds and to impart a desired finished color on the surface of the vulcanized piece. In applying the present invention to the treatment of rubber tires, the external surfaces of the tires prior to vulcanization are treated with a dispersion of a suitable black or substantially black pigment or similar color compound. The tires may be thus treated either by dipping or spraying or by any other suitable method for applying liquids or emulsions of fluid materials to the surfaces. The coating on the tires is then permitted to set, which generally requires only a few minutes. After the coating has set, the coated tires are then inserted in the molding chambers and subjected to vulcanization. As a result of this treatment the tires may be readily removed from the molds when vulcanization is completed. The surface walls of the vulcanized tires are of a black color and hard satiny finish. The finish possesses improved qualities of color and appearance and is so fused into the rubber surface that it is not readily removed or obliterated by wear and abrasion.

In explaining in detail the present invention it is to be understood that the phraseology or terminology herein employed is for the purpose of description and not of limitation, that known equivalents of ingredients herein specified may be substituted, and that the invention is not expressly limited by the terms of the claims except as construed in view of the prior art.

The present invention can be most suitably carried out by proceeding in the following manner: Referring to the accompanying drawing, the tires 10, 10 are passed in succession on any suitable conveying means such as a continuous traveling belt 11 through a hood or spray house, indicated generally by the numeral 12, where they are sprayed with a dispersion of carbon black in a kerosene emulsion such as hereinafter described. Any suitable spraying or applying apparatus may be employed. For example the flexible spray guns shown at 13, 13 may be used. These guns are, of course, connected by suitable means with a source supplying the dispersion such as the receptacles 14, 14. The dispersion sets almost immediately, after which the tires are conveyed to vulcanizing molds (not shown), where the carbon black acts as a lubricant in the same manner as the soapstone formerly employed for this purpose. As a result the tires are prevented from sticking to the molds, and may be readily removed at the termination of the vulcanizing process. The tires are then in a finished condition and possess the desired black coloration which is expected in new tires. This treatment further provides them with a satiny finish which is not only highly desirable but renders it unnecessary to furnish them with the usual finish coating of black paint.

The carbon black dispersion employed in the manner described above is preferably prepared by first making an emulsion of warm kerosene, rosin and ammonia in which the desired amount of carbon black is subsequently dispersed in a cold machine. Sufficient zinc oxide is then added to invert the oil-in-water emulsion initially formed into an emulsion of the water-in-oil type. Then sufficient kerosene is added while mixing or kneading to obtain a pigment concentration of about 25 to 30%, about one hour and a half being required to obtain a concentration of 25%. The resulting dispersion of carbon black in kerosene is in the form of a soft plastic mass, which may be shipped as such, and may be extended with a suitable solvent or diluent, such as low grade gasoline, to obtain a product of sprayable consistency. The diluted product should preferably contain from about 4 to 7% of carbon black.

It is preferable that the coating be set prior to the time the tire is placed in the mold. In the above instance speed of setting is fostered by the presence of the zinc resinate dispersing agent in the dispersion. It is even possible in this way to cause completion of the setting action before the tire leaves the spray chamber, which is desirable since it prevents the accumulation of dirt and the otherwise tacky surface of the uncured tire.

Although it has been found preferable to employ carbon black in the dispersions of the present invention in view of its excellent lubricating properties, it is possible to substitute therefor any other pigment, lake or dye which is of suitable color and has sufficient body to possess lubricating characteristics. It should likewise be understood that other dispersion media may be employed instead of the kerosene, such as gasoline or similar volatile organic solvents, and that substitutes may be utilized for the rosin and ammonia to provide an emulsifying or dispersing agent. The rosin, ammonia and kerosene emulsion described above, however, has been found to be especially adapted for the stated purposes and is therefore preferred. Substitutes for the zinc oxide employed for the purpose of inverting the kerosene emulsion may also be used, for example oxides or salts of other polyvalent metals.

The methods described above not only provide a superior lubricant for the vulcanizing molds but automatically impart to the tires an improved finish which is of the desired black color and possesses an unusual satiny appearance. Moreover, in eliminating the use of soapstone, the maintenance of cleanliness in the factory is facilitated. The elimination of soapstone also reduces the amount of dust in the air and thus reduces the health hazards to the workmen.

I claim:

1. A method of finishing the surfaces of tires which comprises providing the external surfaces thereof with a coating comprising a dispersion of a pigment of substantially black coloration in a fluid dispersion medium, subsequently permitting said coating to set and vulcanizing the tire thus coated.

2. A method of finishing the surfaces of rubber tires which comprises providing the external surfaces thereof with a relatively rapidly setting coating comprising a dispersion of carbon black in a fluid dispersion medium, subsequently permitting said coating to set and vulcanizing the tire thus coated.

3. A method of finishing the surfaces of rubber tires which comprises providing the external surfaces thereof with a relatively rapidly setting coating comprising a dispersion of carbon black in a water-in-oil type of emulsion, permitting said coating to set and then vulcanizing the tire thus coated.

4. A method of finishing the surfaces of uncured rubber objects which comprises providing the external surfaces thereof with a coating comprising a dispersion of carbon black in a fluid dispersion medium, subsequently permitting said coating to set and vulcanizing the uncured rubber object thus coated.

5. A method of finishing the surfaces of uncured rubber objects which comprises providing the external surfaces thereof with a relatively quick setting coating comprising a dispersion of carbon black in an emulsion of the water-in-oil type, permitting said coating to set and then vulcanizing the uncured rubber object thus coated.

6. A method of finishing rubber tires which comprises applying to the exterior surface thereof a coating having as a vehicle, a kerosene emulsion of the oil-in-water type and containing carbon black and a dispersing agent dispersed therein, allowing said coating to set, and thereafter vulcanizing the tire thus coated.

7. A method of finishing rubber tires which comprises applying to the exterior surface thereof a relatively rapid setting coating having a vehicle consisting of an emulsion of the oil-in-water type having carbon black and a resinous dispersing agent dispersed therein, allowing said coating to set, and thereafter vulcanizing the tire thus coated.

8. A method of finishing rubber tires which comprises applying to the exterior surface thereof a relatively rapid setting coating made up of an emulsion of the oil-in-water type in which is dispersed carbon black and zinc rosinate, allowing said coating to set, and thereafter vulcanizing the tire thus coated.

9. A method of finishing the surfaces of uncured rubber objects which conprises applying to the external surfaces thereof a coating comprising a carbon black dispersed in a fluid dispersion medium, and thereafter vulcanizing the object thus coated.

10. A method of finishing initially uncured rubber objects which comprises applying to the exterior surfaces thereof a coating consisting of a vehicle comprising a kerosene emulsion of the oil-in-water type and having carbon black and a dispersing agent dispersed therein, allowing said coating to set, and thereafter vulcanizing the coated but initially uncured rubber object.

11. A method of finishing initially unvulcanized rubber objects which comprises applying to the exterior surface thereof a relatively fast setting coating made up of an emulsion of the oil-in-water type as the vehicle in which is dispersed carbon black and a resinous dispersing agent, allowing the coating to set, and thereafter vulcanizing the initially unvulcanized rubber object thus coated.

12. A method of finishing initially unvulcanized rubber objects which comprises spraying the exterior surface thereof with a coating consisting of a kerosene emulsion as the vehicle in which carbon black and a dispersing agent is dispersed to provide a coating which is relatively rapid in setting, air drying said sprayed coating, and thereafter vulcanizing the initially unvulcanized rubber object thus coated.

GEORGE L. ROBERTS.